United States Patent [19]

Mac Lean et al.

[11] Patent Number: 5,404,709
[45] Date of Patent: Apr. 11, 1995

[54] METHOD FOR SUPPLYING FUEL TO A GAS TURBINE ENGINE

[75] Inventors: Thomas L. Mac Lean, Louisville, Ky.; Richard W. Stickles, Loveland, Ohio

[73] Assignee: General Electric Company, Cincinnati, Ohio

[21] Appl. No.: 236,827

[22] Filed: May 2, 1994

Related U.S. Application Data

[62] Division of Ser. No. 123,667, Sep. 20, 1993, Pat. No. 5,345,757.

[51] Int. Cl.6 .............................................. F02C 7/22
[52] U.S. Cl. ................................... 60/39.06; 60/39.091
[58] Field of Search ............. 60/39.06, 39.091, 39.141, 60/39.826, 734, 739, 740, 742

[56] References Cited

U.S. PATENT DOCUMENTS

| | | | |
|---|---|---|---|
| 3,335,567 | 8/1967 | Hemsworth | 60/39.74 |
| 3,426,527 | 2/1969 | O'Connor | 60/39.14 |
| 3,805,517 | 4/1974 | Sewell et al. | 60/39.091 |
| 4,157,012 | 6/1979 | DuBell | 60/39.46 |
| 4,499,735 | 2/1985 | Moore et al. | 60/739 |
| 4,656,827 | 4/1987 | Puillet | 60/39.281 |
| 4,711,085 | 12/1987 | Lyons | 60/39.141 |
| 4,802,334 | 2/1989 | Eder et al. | 60/261 |
| 4,833,878 | 5/1989 | Sood et al. | 60/39.06 |
| 4,920,740 | 5/1990 | Shekleton | 60/39.141 |
| 5,165,223 | 11/1992 | Ingham et al. | 60/39.141 |
| 5,184,457 | 2/1993 | Hseu et al. | 60/39.141 |
| 5,187,936 | 2/1993 | Kast et al. | 60/734 |
| 5,242,117 | 9/1993 | D'Agostino et al. | 239/533.2 |
| 5,319,931 | 6/1994 | Beebe et al. | 60/39.03 |

*Primary Examiner*—Louis J. Casaregola
*Attorney, Agent, or Firm*—Jerome C. Squillaro; David L. Narciso

[57] ABSTRACT

A combustor apparatus is provided for a gas turbine engine including a circumferential ring of injectors. A fuel manifold provides a source of fuel for the injectors. The combustor apparatus includes a plurality of first fuel flow paths between the manifold and all of the injectors. Fuel is provided to all of the injectors via these first flow paths. At least one second fuel flow path including an electronically switchable valve is coupled between the manifold and a selected one of the injectors to provide additional fuel thereto at certain times when special engine operating conditions, such as demand for initial ignition, crossfire and altitude relight are sensed.

4 Claims, 3 Drawing Sheets

METHOD FOR SUPPLYING FUEL TO A GAS TURBINE ENGINE

The invention herein described was made in the performance of work under a U.S. Government contract.

This application is a division of application Ser. No. 08/123,667, filed Sep. 20, 1993, (U.S. Pat. No. 5,345,757).

BACKGROUND OF THE INVENTION

This invention relates in general to the combustors employed in gas turbine engines and, more particularly, to combustor arrangements with improved combustor fuel flow.

Gas turbine engines typically include annular combustors with a plurality of fuel injectors which are spaced circumferentially around the engine at the combustor section thereof. In one conventional arrangement, each fuel nozzle or injector is coupled via a pressure actuated valve to the fuel supply manifold. In this manner, each injector nozzle is provided with a supply of fuel. Assuming all valve/fuel nozzle combinations are identical and have a common manifold, then they will all have the same fuel flow rate.

To improve ignition, crossfire and altitude relight, it is common to designate one or two of the injectors as "pilot fuel injectors" which have a higher fuel flow rate under all operating conditions, not just at the ignition, crossfire or altitude relight condition. (For purposes of this document, crossfire is defined as the transition from a partially staged combustion to a full burning combustion.) Unfortunately, while the pilot injector approach does provide improved ignition, crossfire and altitude relight, it also produces hot spots or hot streaks within in the combustor section which can cause damage to the combustor section.

SUMMARY OF THE INVENTION

Accordingly, one object of the present invention is to provide a combustor apparatus which achieves improved ignition without causing hot spots within the combustor section.

Another object of the present invention is to provide a combustor apparatus which achieves improved crossfire.

Yet another object of the present invention is to provide a combustor apparatus which achieves improved altitude relight upon flame blowout.

In accordance with one embodiment of the present invention, a combustor apparatus is provided for a gas turbine engine. The combustor apparatus includes a plurality of fuel injectors situated in the engine, and a fuel manifold for supplying fuel to the injectors. The apparatus also includes a plurality of first fuel flow paths coupling the manifold to the plurality of injectors to provide fuel thereto. At least one second fuel flow path is provided for switchably coupling the manifold to at least one of the injectors to supply additional fuel thereto. The combustor apparatus further includes a sensing circuit coupled to the engine for determining if a predetermined engine condition is present. The apparatus still further includes an electronic control circuit, coupled to the sensing circuit and the second fuel flow path, for switching the second fuel path to provide additional fuel to at least one of the injectors when the sensing circuit determines that a predetermined engine condition exists.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
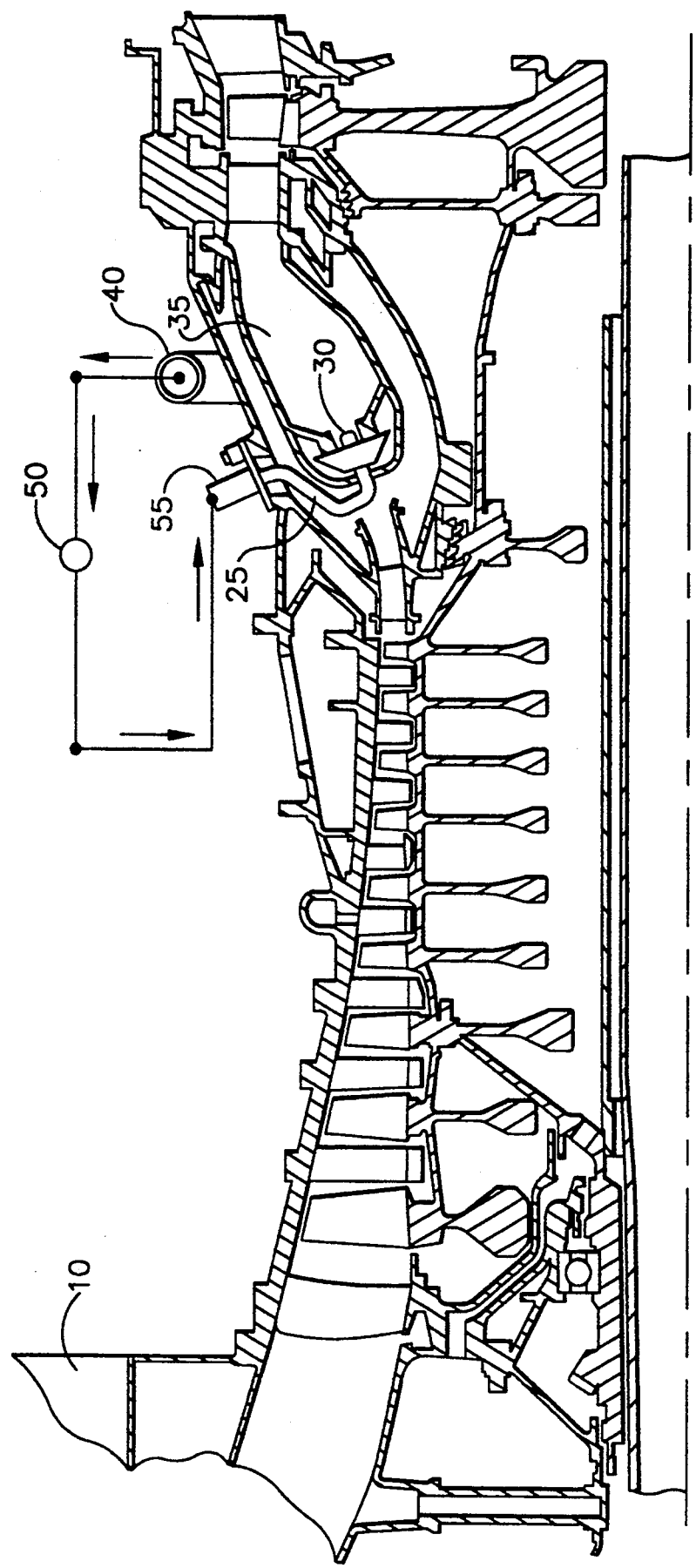
FIG. 1 is a block diagram of one portion of a combustor apparatus in accordance with the present invention.

FIG. 1 is a block diagram which shows a portion of an engine 10 employing the improved combustor apparatus of the present invention. The portion of engine 10 depicted includes a compressor section 15 and a combustor section 20. Combustor section 20 includes a plurality of injectors located circumferentially about the periphery of engine 10 at combustor section 20, one injector of which is depicted as injector 25. Injector 25 includes a nozzle 30 which injects liquid fuel into a combustor chamber 35 in which combustion occurs. In one embodiment of the invention, combustor chamber 35 forms an annular ring in which a plurality of injectors 25 are circumferentially located around the engine.

Figure 2:
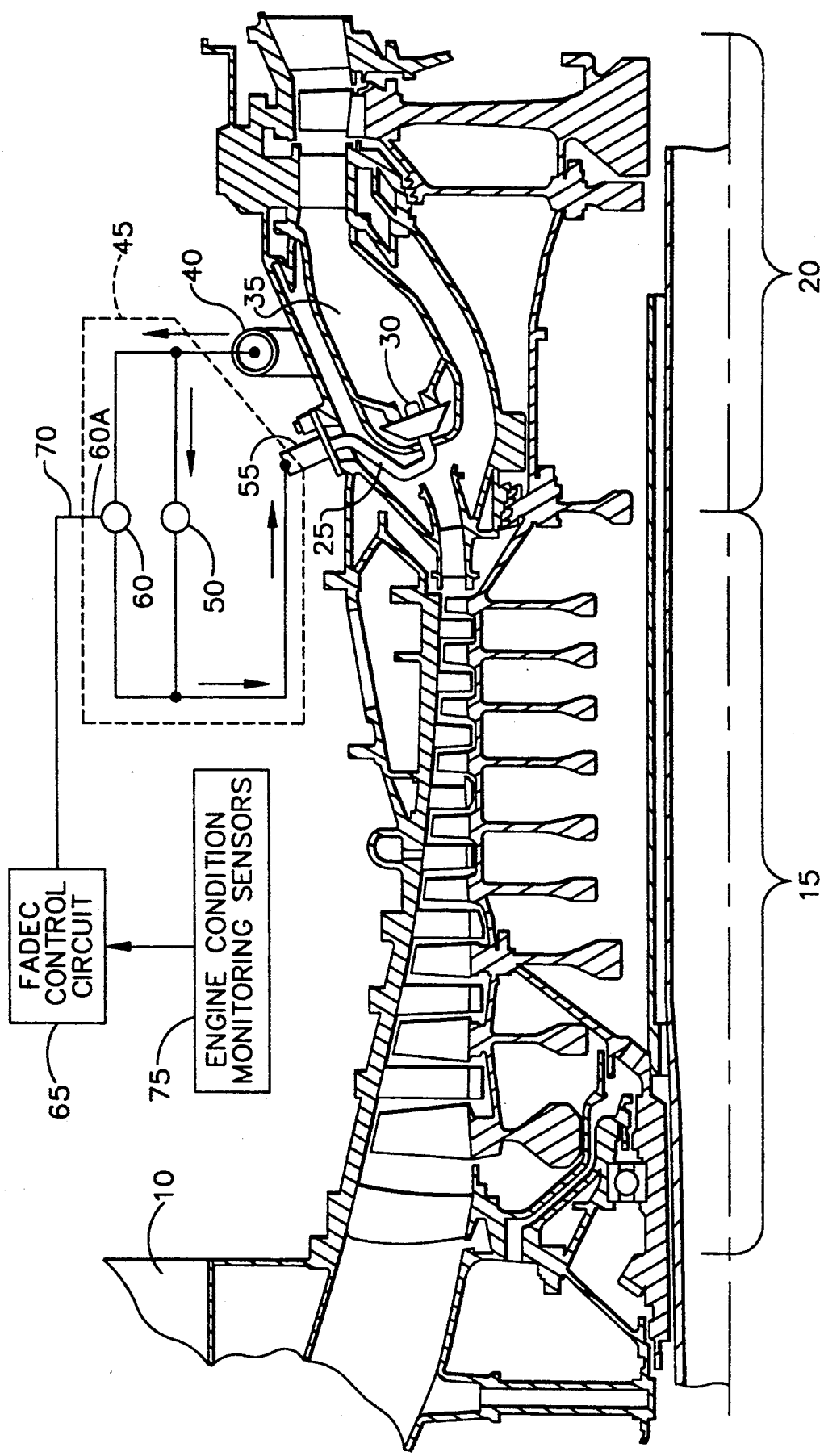
FIG. 2 is a block diagram of another portion of the combustor apparatus of the present invention showing a dual valve arrangement.

A fuel manifold 40 supplies fuel to all injectors 25. While all of injectors 25 are coupled to fuel manifold 40 to receive fuel therefrom via respective pressure-actuated valves 50 and injector inlets 55, selected ones of injectors 25 (which have the special designator 25') are fed fuel by the special dual valve apparatus 45 shown in FIG. 2. Dual valve apparatus 45 includes a standard pressure-actuated flow divider valve 50 which is coupled from the fuel manifold 40 to injector inlet 55 as shown. Fuel flows from manifold 40 to injector inlet 55 where it enters injector 25'.

Dual valve combustor apparatus 45 includes a solenoid fuel valve 60 which is coupled in parallel with valve 50, namely, between manifold 40 and injector inlet 55 as shown. Fuel flows from manifold 40 through valve 60 and to injector inlet 55 under the direction of an electronic control circuit 65, for example, the FADEC (Full Authority Digital Electronic Control) manufactured by General Electric. A control line 70 is coupled from control circuit 65 to a valve control input 60A to accomplish this fuel control through valve 60.

Control circuit 65 actuates valve 60 to permit additional fuel to flow to one or more injectors 25' under certain operating conditions such as when initial ignition, crossfire, or altitude relight are demanded. This additional fuel which is provided to the selected injectors 25' (those with dual valve apparatus 45) at times when these operating conditions are present, has been found to significantly decrease the amount of time required for initial ignition, crossfire and altitude relight. The remaining injectors 25 (those without dual valve apparatus 45) receive the same amount of fuel whether or not these operating conditions are sensed and/or detected. Conventional engine condition monitoring sensors 75 are employed to detect when initial ignition, crossfire or altitude relight are required and to report that information to control circuit 65.

When control circuit 65 finds no special operating conditions such as initial ignition, crossfire or altitude relight demand to be present, then the fuel system operates in a first mode wherein all injector nozzles 30 have equal flow rates. However, when these special operating conditions are sensed, then the fuel system operates in a second mode wherein only those particular injector nozzles 30 having apparatus 45 attached thereto receive additional fuel. In that case, the remaining injector nozzles having no apparatus 45 attached still receive fuel at the same rate as mode 1.

Many different arrangements of injectors 25 without special apparatus 45 and injectors 25' with special apparatus 45 are possible. For example in the circumferential ring formed by injectors 25 and 25', one or two selected injectors, or every other injector around the ring, may have special apparatus 45 attached thereto.

One advantage of this invention is that the fuel flow to a single fuel injection point (injector) Can be increased when necessary (initial ignition, crossfire and altitude relight conditions) by control circuit 65 opening solenoid valve 60. Then, when the condition ceases, control circuit 65 turns off solenoid valve 60 and the fuel system returns to a uniform flow at all injection points. In one engine system, it was found that using two such dual valve apparati 45, a 37% increase in flow to two main stage fuel tip nozzles was observed. During testing, crossfire from pilot to main stage burning times were reduced up to 25% with the solenoid valves of apparati 45 turned on.

Figure 3:
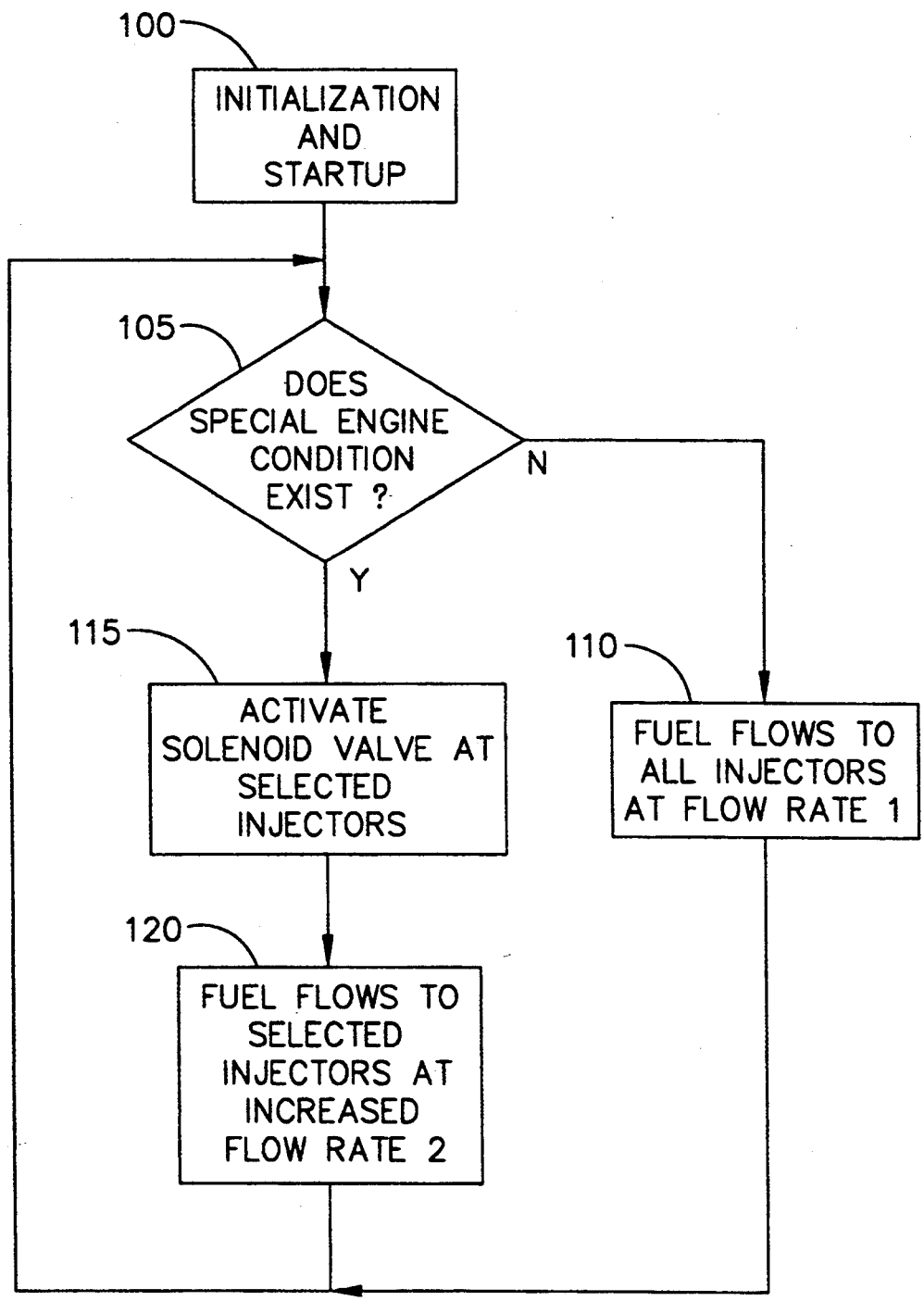
FIG. 3 is a simplified flowchart depicting the operational flow of the combustor apparatus of the present invention.

FIG. 3 is a flowchart which depicts the operational flow of the fuel flow sequence to injectors 25 and 25' in accordance with the present invention. Control circuit 65 is initialized and engine startup begins at block 100. A test is then conducted at decision block 105 to determine if a special engine condition (such as demand for initial ignition, crossfire and altitude relight) exists. If a special engine condition is not sensed at this point, then fuel flow to all injectors is via valve 50 only at each injector. Thus, in this case, fuel flow to all injectors is at a normal first flow rate (rate 1) as indicated by block 110. After establishing flow to all injectors at the first flow rate, process flow continues back to decision block 105 where another test is conducted to determined if a special engine condition now exists.

If a special engine condition (such as initial ignition, crossfire and altitude relight) is at any time found to exist, then those injectors which are equipped with dual valve apparatus 45 have parallel solenoid valve 60 activated (block 115) such that these injectors experience a substantially increased second fuel flow rate (rate 2) as indicated at block 120. Those injectors not equipped with dual valve apparatus 45 still experience the normal first fuel flow rate (rate 1) through valve 50 with which all injectors are equipped. Process flow then continues back to decision block 105 where a test again is made to determine if the special engine condition still exists.

While a combustor apparatus has been disclosed above, it is clear that a method of operating the combustor apparatus has also been disclosed. More particularly, a method for supplying fuel to a gas turbine engine is disclosed wherein the engine includes a plurality of injectors circumferentially spaced about the engine. The method includes the steps of providing a first fuel flow path to each of the injectors and further providing a second fuel flow path to selected ones of the injectors. The method also includes the step of determining if a predetermined engine condition is present. The method further includes the step of causing fuel to flow to each of the injectors along the first flow paths when it is determined that the predetermined engine condition is not present. The method still further includes the step of causing fuel to flow to each of the injectors along the first flow paths and additional fuel to flow to the selected ones of the injectors along the second flow paths when it is determined that the predetermined engine condition is present.

The foregoing has described a combustor apparatus for a gas turbine engine which achieves improved ignition without causing hot spots within the combustor section of the engine. Moreover, the apparatus achieves improved initial ignition, improved crossfire, and improved altitude relight upon flame blowout.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method for supplying fuel to a gas turbine engine, said engine including a plurality of injectors circumferentially spaced about said engine, said method comprising:

providing a first fuel flow path to each of said injectors;

providing a second fuel flow path to selected ones of said injectors, not every one of said injectors having said fuel flow path so provided;

determining if a predetermined engine condition is present;

causing fuel to flow to each of said injectors along said first flow paths when it is determined that said predetermined engine condition is not present, and causing fuel to flow to each of said injectors along said first flow paths and additional fuel to flow to said selected ones of said injectors along said second flow paths when it is determined that said predetermined engine condition is present.

2. A method for supplying fuel to a gas turbine engine, said engine including plurality of injectors circumferentially about said engine, said method comprising:

providing a first fuel flow path to each of said injectors;

providing a second fuel flow path to selected ones of said injectors;

sensing if a predetermined operating condition of demand for initial ignition is present;

causing fuel to flow to each of said injectors along said first flow paths when it is determined that said predetermined engine condition is not present, and causing fuel to flow to each of said injectors along said first flow paths and additional fuel to flow to said selected ones of said injectors along said second flow paths when it is determined that said predetermined engine condition is present.

3. A method for supplying fuel to a gas turbine engine, said engine including a plurality of injectors circumferentially spaced about said engine, said method comprising:

providing a first fuel flow path to each of said injectors;

providing a second fuel flow path to selected ones of said injectors;

sensing if a predetermined operating condition of demand for crossfire is present;

causing fuel to flow to each of said injectors along said first flow paths when it is determined that said predetermined engine condition is not present, and causing fuel to flow to each of said injectors along said first flow paths and additional fuel to flow to said selected ones of said injectors along said second flow paths when it is determined that said predetermined engine condition is present.

4. The method of claim 1 wherein said determining step includes sensing if the predetermined operating condition of demand for altitude relight is present.

* * * * *